Aug. 23, 1938.  A. J. LOEPSINGER  2,128,096
CONDITION CONTROLLING APPARATUS
Filed April 11, 1935   3 Sheets-Sheet 2

Inventor
Albert J. Loepsinger
by Harry Dexter Peck
Attorney

Aug. 23, 1938.  A. J. LOEPSINGER  2,128,096
CONDITION CONTROLLING APPARATUS
Filed April 11, 1935  3 Sheets-Sheet 3
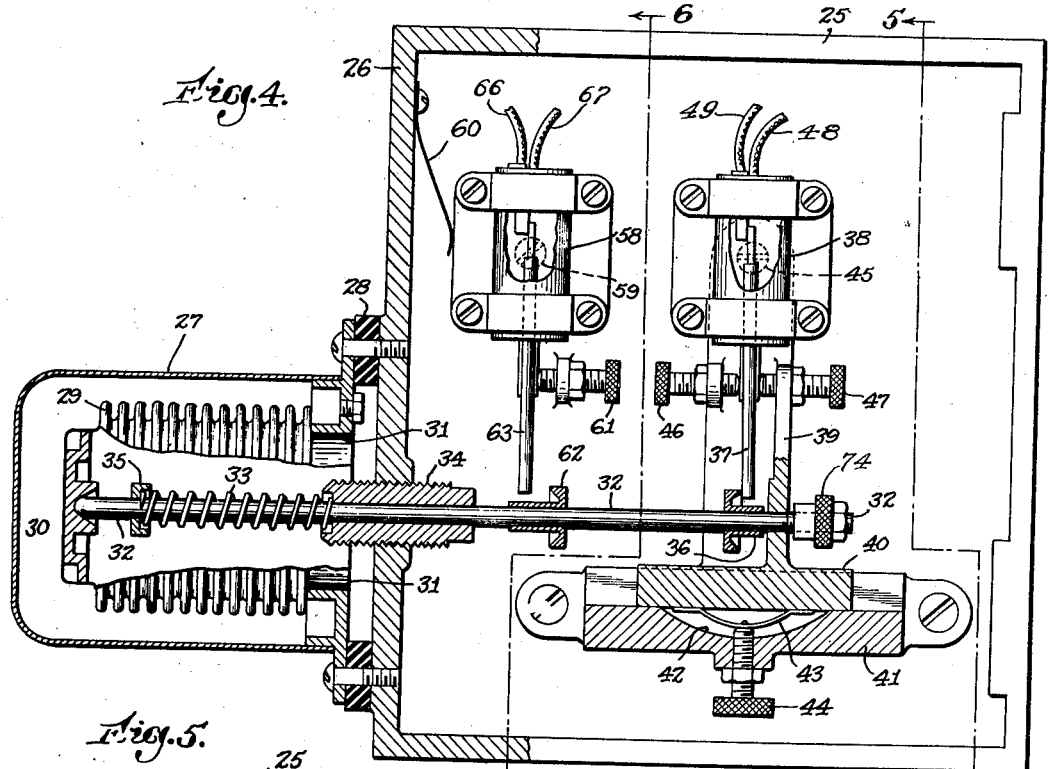
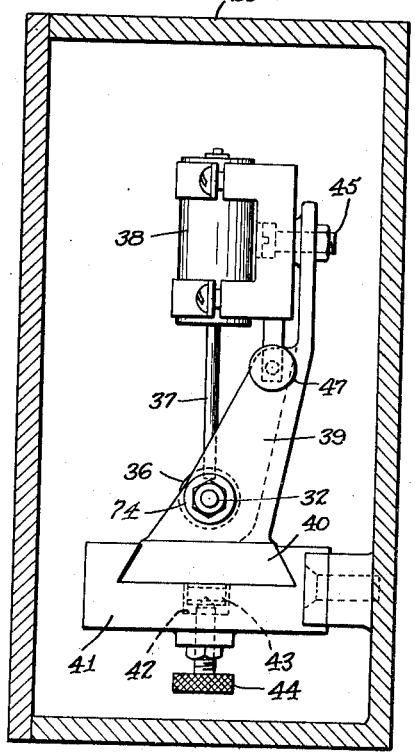
Inventor
Albert J. Loepsinger
by Harry Dexter Peck
attorney Patented Aug. 23, 1938

2,128,096

UNITED STATES PATENT OFFICE 2,128,096

CONDITION CONTROLLING APPARATUS

Albert J. Loepsinger, Providence, R. I., assignor to General Fire Extinguisher Company, Providence, R. I., a corporation of Delaware Application April 11, 1935, Serial No. 15,811

5 Claims. (Cl. 236—44)

This invention relates to improved condition controlling apparatus. More especially it has to do with apparatus for controlling the conditions in an enclosure and is particularly illustrated herein in its application to a humidified enclosure wherein it is desired to effect as comfortable temperature conditions as possible consistent with the maintenance of a required condition of humidity.

In the textile field particularly, the maintenance of a desired humidity condition of the air in a room or enclosure where the processing of textile material is being carried on has long been recognized as essential. Various means have been developed and used for supplying moisture to the air, the commonest and most effective being the atomization of water into extremely small particles resembling a fog which is blown into the atmosphere of the enclosure. The capacity of each humidifying unit is relatively small, and a considerable number of such units are scattered throughout the space to be moistened. On being discharged into the air the small droplets of water composing the fog are evaporated. As this evaporation involves a change of physical state from a liquid to a vapor, the latent heat required is withdrawn from the surrounding air.

Humidification thus inherently also causes cooling. The amount of humidifying apparatus required for a given space depends largely on the number of times that the air of the space is changed. Ordinarily when no ventilating means are provided and air change occurs only because of leakage around window sash and the opening of doors, the air change is approximately at the rate of one to one and a half times per hour. In certain textile processes, particularly spinning, a large amount of heat is given off by the machinery employed for the process, electric motors and lights. When air change is infrequent it is found that with a high outdoor temperature an uncomfortably high temperature is soon reached within the room. For effective cooling more evaporation is necessary, and, inasmuch as the relative humidity must be maintained at the percentage desired for the process, there is required for increased evaporation more frequent air change.

The actual number of changes required is governed by the heat to be absorbed, which depends upon the temperature desired, the amount of heat developed within the enclosure, and the outside temperature. As this may be readily computed for any given case, there is no difficulty in ascertaining the amount of evaporation needed and the number of air changes required. It is to be remembered that, inasmuch as cooling is brought about by evaporation, the effectiveness of the system as a cooling agent is always dependent upon the moisture content of the outside air. Ordinarily a system is designed to maintain a desired indoor temperature when the outside dry bulb temperature is near the maximum to be expected and the relative humidity at a low percentage. Should the outside dry high bulb temperature be accompanied by rising humidity the effectiveness of any system depending for its cooling effect upon evaporation is necessarily decreased.

Heretofore when cooling was desired it has been customary to supply humidifying apparatus of suitable capacity and to depend for ventilation upon the manual adjustment of windows. For example, when the indoor temperature became uncomfortable, windows would be opened and remain so, as long as the humidity was maintained at the desired percentage. When it was observed that the humidity had fallen below that desired readjustment of the windows was made. This rather hit-or-miss method of ventilation seldom produced the maximum degree of cooling that the system was capable of, and there was always the possibility that too much ventilation would be provided with consequent drop of indoor relative humidity which might not be immediately noticed.

As applied to the control of conditions in a humidified enclosure, it is an object of the invention to provide for the starting of ventilation of the enclosure in response to a rise of the temperature therein and shutting off the ventilation whenever the relative humidity falls below a predetermined minimum. It is an important feature of the improved apparatus that the starting of the ventilation does not occur at any particular temperature but because of a rise in temperature from a temperature which has previously been attained by the prior cooling action of the system. This insures a most prompt response of the ventilators and thus enables the room temperature to be kept as low as is possible consistent with the maintenance of a desired relative humidity.

It is also an object of the invention to provide improved control means for effecting a desired condition.

Where the necessity of maintaining a desired humidity condition exists the invention provides that the ventilation will be stopped upon the relative humidity falling below a predetermined minimum. If this minimum can be maintained while the ventilating means are in operation, then the maximum cooling effect may be enjoyed. Should the outside air happen to have a moisture content such that, when this air is brought to approximately the temperature within the enclosure, its relative humidity is more than that desired in the room, the humidifiers will continue idle and the relative humidity can not be controlled. Under such unusual conditions, if the temperature of the outside air is high, it is desirable to have the ventilating means continue in operation because although no cooling effect can be gained by evaporation the change of air does produce more comfortable conditions than if no such change were provided. If the temperature of the outside air is so low that the change of air would produce an inside temperature much lower than would be comfortable then the improved apparatus provides a thermostatic control for rendering the ventilators inactive whenever the room temperature falls to a predetermined low degree.

If the incoming air is such that the desired relative humidity can be maintained, with maximum ventilation and humidification then conditions may be said to be in balance and both the humidifying and ventilating means will operate continuously. If the change of air does not overtax the humidifiers, then the ventilating means will run steadily and the humidifiers will be operated intermittently as needed. When the operation of the ventilating means does overtax the humidifiers, there will be intermittent operation of both agencies, as they function to maintain the desired relative humidity and cool the enclosure as far as possible consistent with such maintenance.

The novel control apparatus herein disclosed for starting the ventilation in response to a rise in temperature is responsive to all temperature changes within the enclosure. Such changes in excess of the range of the rise in temperature which starts ventilation affect the setting or positioning of the apparatus and thereby determine the temperature from which said rise becomes effective. Because of this adjusting or setting of the thermostatic control apparatus in response to temperature changes, the system readily accommodates itself to the prevailing conditions and thus enables the maximum cooling effect to be attained consistent with proper humidification.

The best mode in which I have contemplated applying the principles of my invention are shown in the accompanying drawings, but these are merely illustrative and it is intended that the patent shall cover by suitable expression in the appended claims whatever features of patentable novelty exist in the invention disclosed.

In the accompanying drawings:

Figure 4 is an elevation of the temperature actuated control unit, partly in section, and with the cover removed;

Figure 5 is a vertical section taken as on line 5—5 of Figure 4;

Figure 6 is a vertical section taken as on line 6—6 of Figure 4; and

Figure 7 is an elevation of the control unit, with the casing in section, which is responsive to changes of relative humidity.

Figure 1:
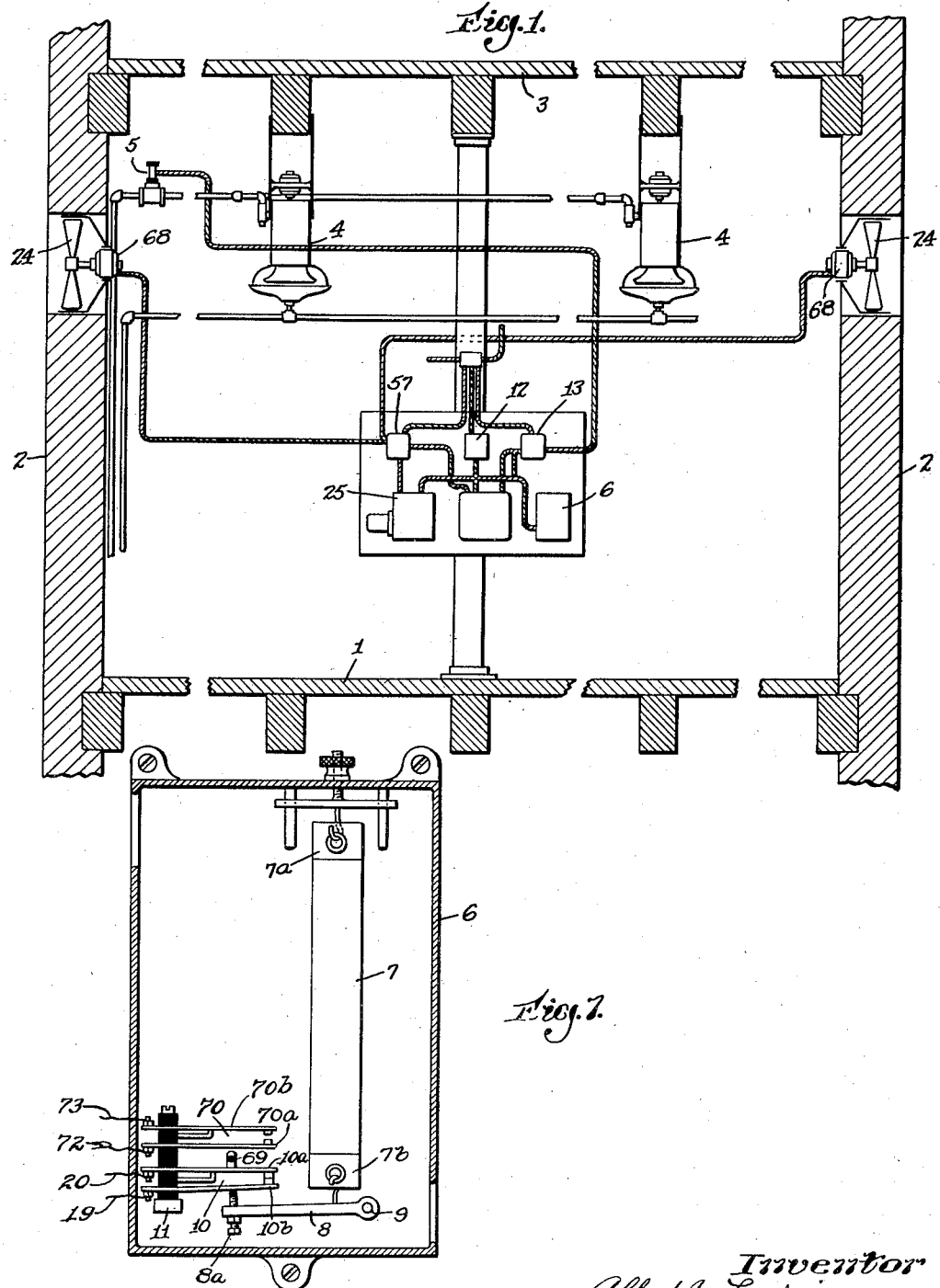
Figure 1 is a section in elevation of a room or other humidified enclosure provided with controllable ventilating means.

Referring now more particularly to the drawings, there is shown in Figure 1 a humidified enclosure having a floor 1, walls 2 and ceiling 3 which is representative of a room in a textile mill, or any enclosed space, wherein it is desired to maintain a predetermined humidified condition of the atmosphere and to keep the temperature as comfortable as possible consistent with such maintenance. Humidifying means are provided for introducing moisture into the air of the enclosure, such means being indicated by humidifiers 4, whose supply of water is under control of a solenoid valve 5. This valve is operated by a controller 6 responsive to changes in the humidity condition of the room air.

The particular controller illustrated (see Figure 7) comprises a hygroscopic member 7 (that shown being a piece of animal membrane composed substantially of elastic tissue) which elongates or shortens in accordance with changes of relative humidity. As the latter increases the membrane lengthens and as the relative humidity falls the membrane shortens. One end 7a of this member is adjustably fixed in position and the other end 7b is connected to a lever 8 pivoted at 9. The movements of this lever, due to the response of the hygroscopic member to changes in relative humidity, are utilized to open or close an electric switch 10, here shown as having resilient terminals 10a and 10b mounted in an insulated base or holder 11. When the relative humidity falls and the hygroscopic member contracts or shortens, as seen in Figure 7, an adjustable insulated screw 8a carried by the lever 8 is pulled upward against terminal 10b and pushes the latter into contact with terminal 10a, thus closing the switch. This establishes a circuit between a transformer 12 and a relay 13, both of which are suitably connected to power lines.

Figure 2:
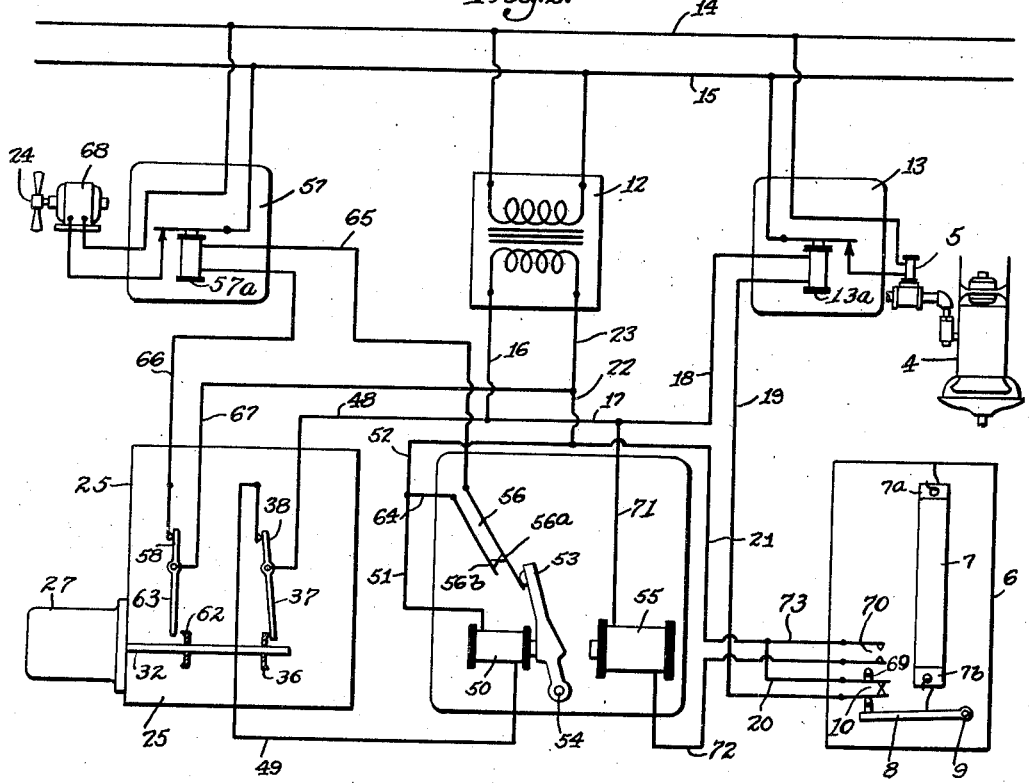
Figure 2 is a diagrammatic showing of the electrical circuits and associated control means in the positions assumed when both the humidifiers and ventilating means are active.

In Figure 2 this circuit is shown as comprising wires 16, 17, 18, a magnet 13a, wire 19, switch 10, wires 20, 21, 22 and 23. When this circuit is closed, the resulting energization of the relay 13 brings about a connection between power lines 14, 15 and the solenoid of valve 5 which effects an opening of the valve with consequent flow of water to the humidifiers. Moisture is thus introduced into the air and in due course the relative humidity will rise. This will cause the hygroscopic member 7 to elongate, the lever 8 will swing downward and when the predetermined maximum degree of relative humidity is reached the terminals 10a and 10b will be again separated, the relay 13 de-energized, and the water control valve 5 closed. Thus the humidifying means is rendered active or inactive solely in response to changes in humidity conditions.

In the particular application of the invention shown herein for illustration the improved apparatus has to do with the control of ventilating means whereby an exchange of air may be effected between the outside and the inside of the humidified enclosure. Such means are here represented as motor driven fans 24 suitably mounted in the walls of the enclosure, one being capable of drawing air from the outside into the enclosure and the other being capable of propelling air from inside the enclosure to outside thereof. It is, of course, evident that other ventilating means such as windows, louvers, etc.

might be employed in effecting such change of air.

Let it be assumed for clarity of disclosure, that the relative humidity of the enclosure is higher than the desired maximum percentage, in which event the hygroscopic member 7 will be elongated, terminals 10a, 10b will be open and the humidifiers inactive. Let it be further assumed that the temperature within the enclosure is uncomfortably high. Obviously no appreciable relief can be expected from evaporation of moisture by the room air because it is already assumed to be sufficiently humidified and the humidifiers inactive. Under such conditions the room temperature is bound to rise assuming, of course, that there is no great exfiltration of heat from inside to outside the enclosure. Heretofore the relief available is that to be gained by manually opening doors or windows to effect a change of air. The improved apparatus, however, provides for the automatic starting of the fans, or whatever ventilating agencies are used, and this is accomplished in the system disclosed by means of a novel thermostatic controller 25.

This controller (see Figures 4-6) comprises a main casing 26 having attached on one side thereof an auxiliary casing 27. This attachment is desirably made so as to resist the transfer of heat between the two casings, there being shown herein a heat insulating ring 28 between the two casings. Incorporated in the auxiliary casing is a flexible bellows 29, which is secured to the casing at 31 to provide a hermetically sealed space 30 between them. A highly volatile fluid, such as ethyl chloride for example, is provided in this sealed space and the resulting pressure changes due to the expansion or contraction of this fluid are utilized in flexing the bellows. As shown in Figure 4, the assumed high temperature of the room air bathing the auxiliary casing 27 has caused the fluid to expand and force the bellows to contract. Since one end of the bellows is secured to the casing its other end has moved to the right as the bellows contracts.

Such movement of the bellows forces a rod 32 to move likewise to the right, overcoming as it does so the force of a coiled spring 33 which bottoms in the recessed end of an adjusting screw 34 threaded through the wall of the main casing. The other end of the spring rests against a flanged sleeve or collar 35 secured to the rod. The spring is constantly tending to push the rod and bellows toward the left and the amount of this tendency may be altered by adjusting the screw 34. Secured to this rod is another flanged sleeve 36, the flange of which is arranged to make contact with the stem 37 of a vacuum switch 38. If this sleeve is separated from the stem 37, a slight movement of the rod to the right will bring the sleeve in contact with the stem and further slight movement of the rod and sleeve to the right will tilt the stem and close the switch 38. Further movement of the rod brings the end of the sleeve 36 against a standard 39 of a slide 40 which is suitably shaped to move in a bracket block 41 secured to the main casing. This block has a recess 42 in which is a spring 43 arranged to press against the slide in accordance with the setting of an adjusting screw 44. When the sleeve 36 engages the slide, further movement of the rod 32 to the right pushes the slide and switch 38 along with it. The switch 38 is pivotally mounted on the standard of the slide by means of a bolt 45 and may be adjusted about this pivot by means of the thumb screws 46, 47. This adjustment insures the proper closing of the switch by the engagement of the stem 37 and the flange on sleeve 36, prior to the sleeve making contact with the standard 39.

The closing of switch 38 establishes a circuit between the transformer 12 and a magnet 50. (See Figure 2.) This circuit comprises wires 16, 48, the switch 38, wire 49, magnet 50 and wires 51, 52, 22 and 23. The consequent energization of magnet 50 causes a lever 53, pivoted at 54, to swing to the left (assuming for the moment that another magnet 55 is not energized) and press one terminal 56a of a switch 56 against its other terminal 56b. The closing of this switch by the lever 53 may establish a circuit from transformer 12 to a relay 57, provided that another switch 58 is also closed.

This latter switch 58 is the low temperature limit control and renders the ventilating means inactive whenever the temperature falls to a predetermined low degree. It is conveniently another vacuum switch like switch 38, but it is mounted pivotally by a bolt 59 on the main casing 26 (see Figures 4 and 6). A light spring 60 normally holds the switch against an adjusting screw 61 also mounted on the main casing. If, however, the temperature falls below some predetermined limit—the predetermined low degree—the fluid in the sealed chamber 30 of the auxiliary casing 27 will exert less pressure and allow the bellows to expand under the force of spring 33 acting on rod 32. As the rod moves to the left, another flanged sleeve 62 secured to it will contact with the stem 63 of switch 58 and cause this switch to open, the switch being then held against rotation about its pivot by the spring 60. If the rod continues to move to the left under a falling temperature, the flanged sleeve 62 pressing on the stem will swing the switch about its pivot 59.

Since under the assumed condition of high temperature, the bellows will be contracted and the rod will have moved to the right far enough to have separated its flanged sleeve 62 from the stem 63, the switch 58 will be closed and, as previously stated, the closure of switch 56 by the lever 53 will establish the low voltage circuit through relay 57. This circuit comprises the wires 16, 48, switch 38, wire 49, magnet 50, wires 51, 64, switch 56, wire 65, magnet 57a, wire 66, switch 58, and wires 67 and 23. The energization of relay 57 effects a power connection from the lines 14, 15 to the motors 68 which operate the ventilating fans 24. Thus the ventilating means is rendered active whenever switch 58 is closed, by the closing of the switch 38, the energization of magnet 50, and the swing of lever 53 to the left with consequent closing of switch 56.

The resulting operation of the ventilating means effects a change of air between the outside and inside of the enclosure. If the incoming air is so moist that the relative humidity is still maintained above the desired maximum, the humidifiers will remain inactive. If this new air is high in temperature, no great relief can be expected, though obviously some comfort will be enjoyed by the operatives due merely to a change in air. If the outside air is cooler than the inside air, the room temperature will fall and thus cool the enclosure, giving the desired comfort to the operatives. If by chance this reduces the inside temperature to below the predetermined low degree, then the rod 32 will move to the left far enough to cause flange sleeve 62 to engage the stem 63 of switch 58 and thus open the circuit to the relay 57. The latter will thereupon be de-energized, the power circuit to the fan motors opened, and the ventilating means rendered inactive, thus stopping the ventilation.

Of course, the movement of rod 32 to the left will first disengage flanged sleeve 36 from the stem 37 of switch 38 and open the circuit through the magnet 50. This is of no consequence because the lever 53, due to its weight and position with respect to its pivot 54, will continue to keep switch 56 closed. Accordingly, even though switch 38 be opened, the ventilating means will continue in operation until the temperature falls so low as to bring about the opening of switch 58 as just described, or until the relative humidity falls to a predetermined minimum. If the latter occurs while the temperature is still above the predetermined low degree, the ventilating means are rendered inactive by the controller 6.

As previously described, a falling relative humidity causes the hygroscopic element 7 to shorten and swing lever 8 clockwise about its pivot 9. At some percentage or condition of relative humidity, the lever will have been so swung to effect closing of switch 10 and start the humidifiers in action. If the simultaneous operation of the ventilating means results in the maintenance of the desired humidity condition, both means will continue active and the maximum cooling effect of the system will be enjoyed. If, however, the operation of the humidifying means raises or increases the humidity condition to the predetermined maximum, then the hygroscopic element will lengthen, cause switch 10 to open, and stop the humidifiers. Thus, if the operation of the ventilating means does not overtax the humidifying means, the former will continue to be active and the latter will be active intermittently.

Figure 3:
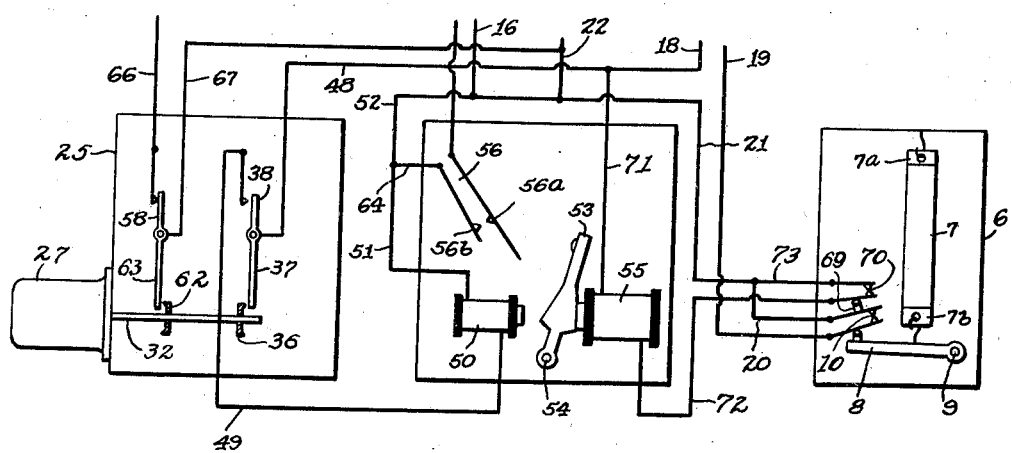
Figure 3 is a similar showing when the humidifiers are running and the ventilating means is inactive.

But if the continued operation of the ventilating means overtaxes the humidifying means, so that even after the latter are rendered active by the closing of switch 10 the relative humidity continues to fall, hygroscopic element 7 will shorten to a further extent and swing lever 8 still further in a clockwise direction. This will cause the closed terminals 10a and 10b to bend upward and move an insulated pin 69 on terminal 10a against a terminal 70a of another switch 70. When a predetermined minimum relative humidity or humidity condition is reached, terminal 70a will have made contact with terminal 70b and thus closed switch 70. This switch governs the energizing circuit through magnet 55, previously mentioned, and comprises wires 16, 17, 71, magnet 55, wire 72, switch 70, wires 73, 21, 22 and 23. The magnet 55 when energized is more powerful than magnet 50 even though the latter be also energized and therefore, upon the closure of switch 70 and the consequent energization of magnet 55, the lever 53 will be pulled to the right to the position shown in Figure 3. This will permit terminal 56a of switch 56 to separate from terminal 56b and break the energizing circuit through relay 57. The latter will cut out the power circuit to motors 68 and stop the fans 24. Thus the ventilating means are rendered inactive by a fall of relative humidity or a change in the humidity condition within the enclosure to a predetermined minimum.

Upon the rendering of the ventilators inactive, thus stopping the controlled exchange of air, the relative humidity within the enclosure will rise. This will cause hygroscopic element 7 to elongate and as the predetermined minimum humidity condition is exceeded, switch 70 will be opened, thus de-energizing magnet 55. If, as is usual, the action of the humidifiers and the consequent evaporation of moisture by the room air has had a cooling influence, so that the fluid in space 30 has contracted and permitted rod 32 to move to the left, the sleeve 36 will have been separated from stem 37 of switch 38 and the latter opened. If this condition has resulted in an appreciable movement of rod 32 to the left, so that the thumb nut 74 has made contact with the standard 39, then the slide 40 together with switch 38 as a whole will also have moved to the left in accordance with the falling temperature.

Normally, upon the rendering of the ventilating means inactive and the continued operation of the humidifiers as just described, the relative humidity will increase, the hygroscopic member 7 will lengthen, and when the predetermined maximum humidity condition is reached, switch 10 will be opened and the humidifiers stopped. This at once reduces the evaporation of moisture and the absorption of sensible heat, and in consequence the room temperature will rise. This causes the fluid in space 30 to expand and move rod 32 to the right again. But since this rod was moved to the left in accordance with the falling temperature, and thereby moved the slide and switch 38 also to the left, only a slight rise from the previously attained temperature is needed to move rod 32 and its sleeve 36 to the right far enough to effect starting of the ventilating means. This is a particular feature of the improved apparatus, namely that it provides for the rendering of the ventilating means active upon a slight rise in temperature from a temperature previously attained. The temperature need not rise to any particular degree but only a slight amount from a previously attained temperature. This is due to the fact that the thermostatic controller responds to all changes in temperature and any such changes which exceed the range of the rise in temperature sets the controller in accordance with such changes and determines the temperature at which said rise will be effective to render the ventilating means active.

I claim:

1. Apparatus for cooling a humidified enclosure comprising means for effecting evaporation within said enclosure; means for effecting a change of air in said enclosure; and control means responsive to temperature changes for rendering said air exchange means active upon rise in temperature within the enclosure occurring above a predetermined low degree; said control means comprising an element movable in accordance with changes in temperature; an element arranged to be moved by said movable element, with provision for initial movement of the first said movable element before the second said element is moved; and a circuit controlling member carried by the second said element and arranged to be actuated and thereby alter its control of its circuit, during the said initial movement of the first said movable element.

2. Apparatus for humidifying and ventilating an enclosure comprising humidifying means, humidity responsive means in control thereof, ventilating means, and temperature responsive means in control thereof; said humidity responsive means being adapted to stop ventilation irrespective of the temperature responsive means upon drop in humidity; and said temperature responsive means including two movable control members, one of said members being movable by said temperature responsive means and left at its extreme position, and the other of said members being movable relative to the first member so that the control is effected by a variation in temperature from the previously attained extreme.

3. Apparatus for ventilating an enclosure comprising ventilating means with humidity responsive means and temperature responsive means in control thereof; said humidity responsive means being adapted to stop ventilation irrespective of the temperature responsive means upon drop in humidity; and said temperature responsive means including two movable control members, one of said members being movable by said temperature responsive means and left at its extreme position, and the other of said members being movable relative to the first member so that the control is effected by a variation in temperature from the previously attained extreme.

4. Apparatus for ventilating an enclosure comprising ventilating means with humidity responsive means and temperature responsive means in control thereof; said humidity responsive means being adapted to stop ventilation irrespective of the temperature responsive means upon drop in humidity and said temperature responsive means being adapted above a minimum temperature to start ventilation in response to a predetermined rise in temperature from a temperature previously attained.

5. Apparatus for ventilating an enclosure comprising ventilating means with humidity responsive means and temperature responsive means in control thereof; said humidity responsive means being adapted to stop ventilation irrespective of the temperature responsive means upon drop in humidity and said temperature responsive means being adapted above a minimum temperature to start ventilation in response to a rise in temperature predetermined by the temperature at which said rise begins.

ALBERT J. LOEPSINGER.